United States Patent [19]

Burba et al.

[11] Patent Number: 5,167,396
[45] Date of Patent: Dec. 1, 1992

[54] VIBRATION ISOLATING MOUNT FOR VIBRATORY PILE DRIVER AND EXTRACTOR

[75] Inventors: Phillip E. Burba, Kirkwood; William R. Beaman, Manchester, both of Mo.; Richard L. Palinkas, Northfield, Conn.

[73] Assignee: Dynasauer Corp., St. Louis, Mo.

[21] Appl. No.: 767,081

[22] Filed: Sep. 27, 1991

[51] Int. Cl.⁵ .............................................. F16M 13/00
[52] U.S. Cl. ..................................... 248/610; 248/638
[58] Field of Search ......................... 248/638, 610, 612; 267/153, 292, 294, 141.1, 141

[56] References Cited

U.S. PATENT DOCUMENTS

| | | | |
|---|---|---|---|
| 3,211,491 | 10/1965 | Browne et al. | 267/292 X |
| 3,343,770 | 9/1967 | Szonn | 267/153 X |
| 3,803,853 | 4/1974 | Kuus | 267/153 X |
| 3,929,729 | 12/1975 | Chung | 267/153 X |
| 3,975,007 | 8/1976 | Chorkey | 267/292 X |
| 4,198,037 | 4/1980 | Anderson | 267/153 |
| 4,806,437 | 2/1989 | Yokoi et al. | 267/153 X |
| 4,887,788 | 12/1989 | Fischer et al. | 248/638 X |
| 5,017,328 | 5/1991 | Mazurek | 267/141 X |

Primary Examiner—David M. Purol
Attorney, Agent, or Firm—Rogers, Howell & Haferkamp

[57] ABSTRACT

A vibration isolating mount for use with a vibratory pile driver and extractor is comprised of a pair of identical plates that are spaced from each and are interconnected by a polyether-based urethane center member. Each of the plates are provided with pluralities of attachment holes for attaching the vibration isolating mount between an exciter and a suspension housing of a vibratory pile driver and extractor. Each of the plates is also provided with pluralities of lug holes that are filled with the polyether-based urethane of the center member and provide a mechanical connection between the plates and the center member in addition to a chemical bond adhering the plates to the center member. The structural characteristics of the vibration isolating mount and the polyether-based urethane employed in constructing the mounts provide a vibration isolating mount that is capable of sustaining larger shear stress forces than prior art mounts and is more capable of resisting deterioration by exposure to the environment than are prior art vibration isolating mounts.

13 Claims, 2 Drawing Sheets

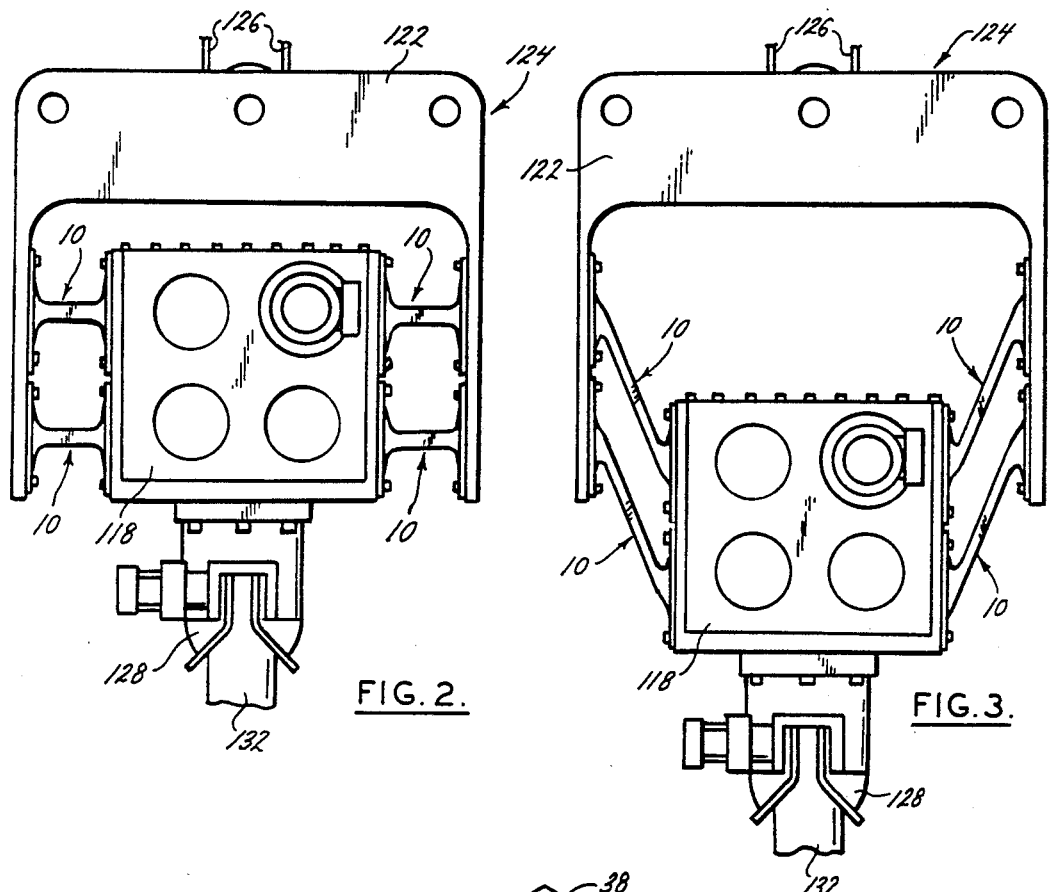
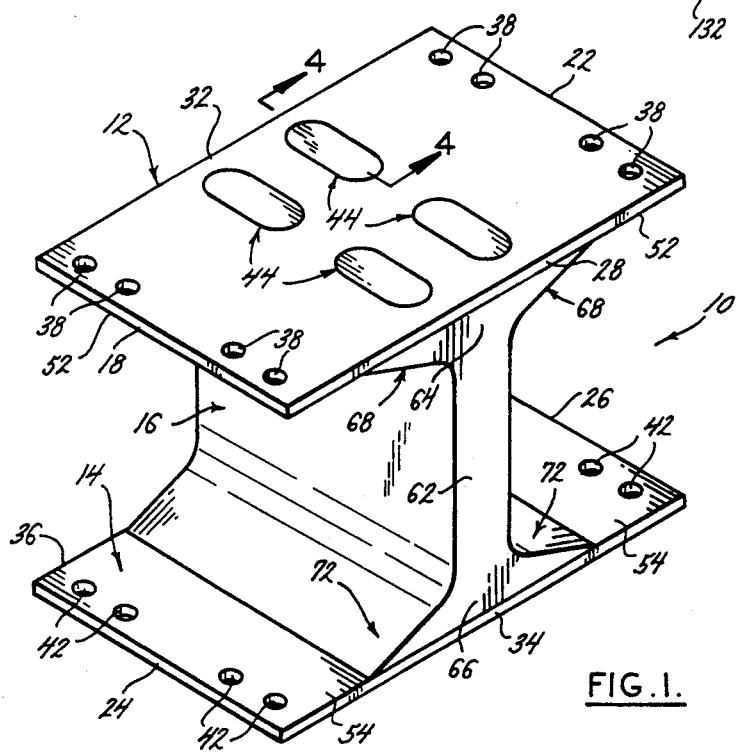

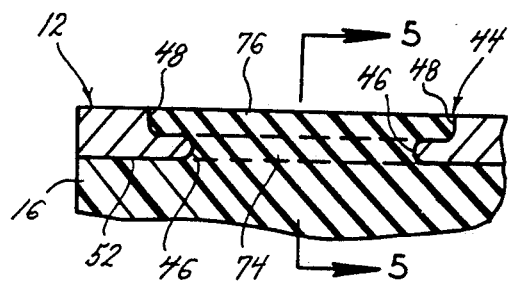
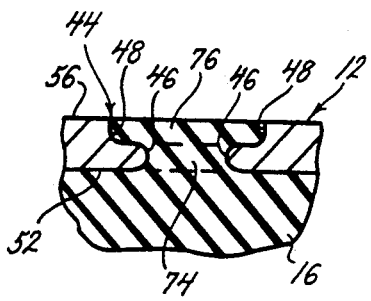
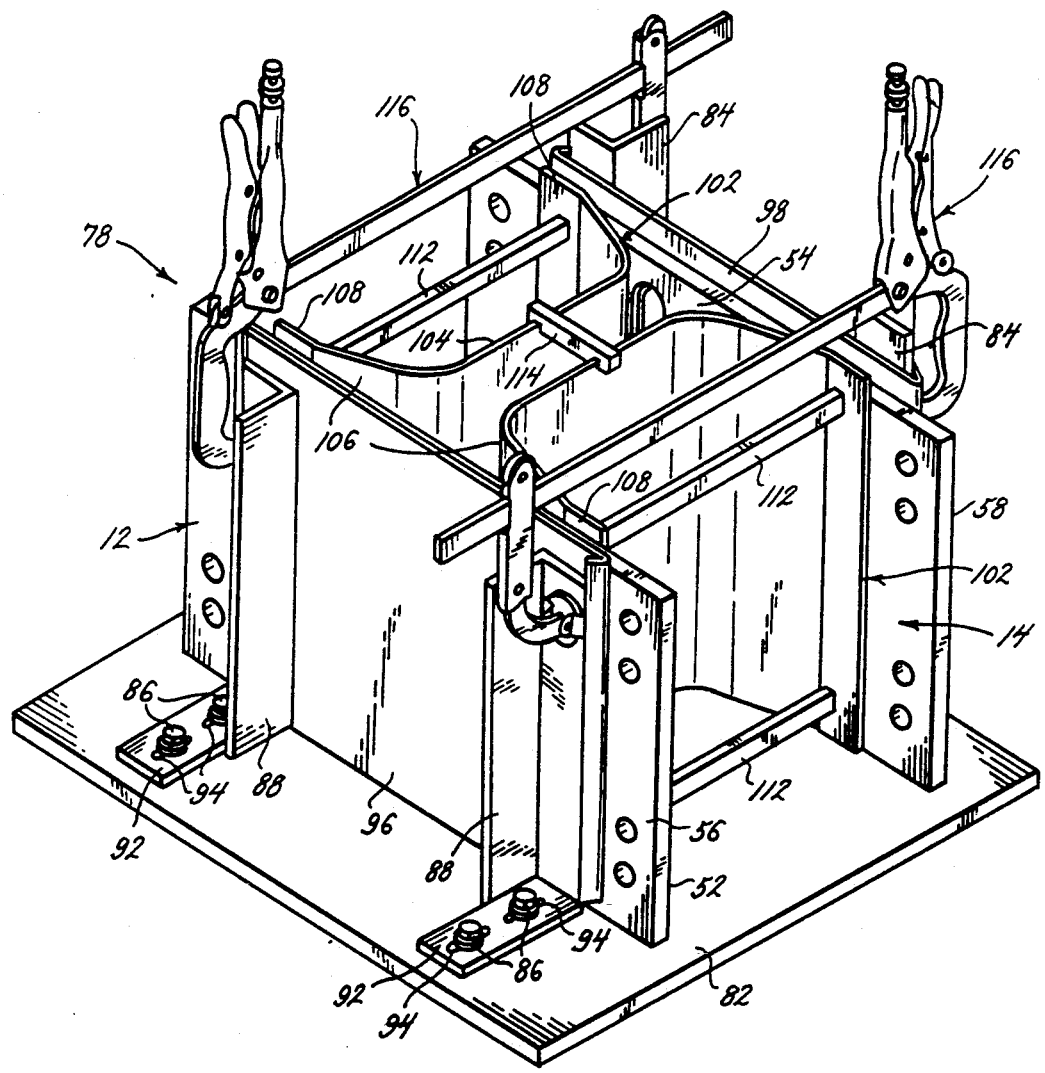

VIBRATION ISOLATING MOUNT FOR VIBRATORY PILE DRIVER AND EXTRACTOR

BACKGROUND OF THE INVENTION (1) Field of the Invention

The present invention relates to a vibration isolating mount for use with a vibratory pile driver and extractor. In particular, the present invention relates to an improved vibration isolating mount that provides improved isolation of high vibration forces, an increased resistance to failure when the vibration isolating mount is stressed in shear, and provides an increased resistance to deterioration from prolonged exposure to the environment.

(2) Description of the Related Art

Vibratory pile drivers and extractors of the type with which the present invention is employed are generally comprised of four distinct parts. A suspension housing, a plurality of vibration isolating mounts, a vibratory exciter, and a clamp housing. The suspension housing is suspended by a cable from a crane, and is connected to the vibratory exciter by a plurality of vibration isolating mounts. The clamp housing is bolted to the vibratory exciter and is operated by hydraulic pressure to grip the top edge of metal sheeting or the top end of a pile that is to be driven into or pulled from the ground. A typical vibratory exciter of the prior art consists of a housing containing an eccentric that is driven by a hydraulic motor. The hydraulic motor rotates the eccentric and the rotation of the eccentric produces a vibration that causes the entire vibratory exciter and clamp housing assembly to vibrate up and down.

The vibration of the vibratory exciter, secured to the top of the metal sheeting or pile by the clamp housing, transmits a pulsating force to the sheeting or pile. When the vibratory exciter and clamp housing assembly is suspended by the crane cable so that the assembly is essentially just resting on the top of the sheeting or pile, the vibration of the vibratory exciter will produce a pulsating up and down force on the sheeting or pile that will enable the weight of the exciter and clamp housing assembly to drive the sheeting or pile downward into the ground. When employing the exciter and clamp housing assembly as a driver, the isolating mounts connecting the exciter to the suspension housing reduce the vibration to the suspension housing.

It is desirable that virtually no vibration be transmitted to the suspension housing and then through the crane cable to the crane. However, the vibration from the exciter must still be transmitted to the sheeting or pile through the clamp housing.

When employing the vibratory pile driver and extractor to extract metal sheeting or piles from the ground, the vibratory exciter and clamp housing assembly are again positioned on the top edge of the sheeting or the top end of the pile and the clamp is actuated to grip the top of the sheeting or pile. With the clamp gripping the sheeting or pile, and the vibratory exciter motor running, the suspension housing is raised by the crane operator so that the vibration isolating mounts connecting the vibratory exciter to the suspension housing are stretched. The stretched isolating mounts exert an upward pulling force on the vibratory exciter and then to the sheeting or pile through the clamp housing. The origin of this upward pulling force is the amount of force exerted by the crane cable.

Prior art vibration isolating mounts are typically comprised of a large rectangular block of rubber, with a large hole in the center, that is chemically bonded between a pair of metal plates. One plate of the pair is secured to the vibratory exciter and the other is secured to the suspension housing. These isolating mounts were not designed specifically to be used on vibratory pile driver and extractor equipment. They were "Dock Fenders" used for absorbing compression loads of ships docking against loading docks. These mounts have been found to be disadvantaged in that their materials and their construction permit the exertion of only a limited pulling force before they fail in shear stress. Shear stress failure of prior art vibration isolating mounts subjected to a large pulling force occurs when one or both of the metal plates begin to separate from the rubber block or the rubber block itself begins to tear.

The useful life of prior art vibration isolating mounts is also lessened by their prolonged exposure to the outside environment during use. It has been observed that exposure to the environment has a deteriorating effect on the rubber blocks of prior art mounts. The deterioration of the blocks lessens the mounts useful life.

The vibration isolating mount of the present invention overcomes disadvantages associated with prior art mounts by providing a mount of unique construction and design that enhances the ability of the mount to resist shear stress failure. It was designed specifically to solve the problems of the mounts previously being used in the vibratory pile driver and extractor industry. The construction of the mount enables it to sustain a much larger pulling force without failing than was heretofore available with prior art vibration isolating mounts.

The vibration isolating mount of the present invention is very effective in reducing vibration of crane cables in both driving and pulling operations. The pulling operation, particularly the large shear stresses developed by the pulling force required to pull some sheeting or piles from the ground, causes a cross section area of a polyurethane center section of the mount to be reduced considerably as the center section elongates in response to the large pulling force involved. This reduced cross section of the polyurethane center member is very effective in reducing the amount of vibration transmitted to the suspension housing and then to the crane cable.

The unique construction also provides a vibration isolating mount that has significantly less weight than prior art mounts and therefore is easier to manipulate and less expensive to ship than prior art mounts.

The vibration isolating mount of the present invention is also constructed of materials that are more resistant to the deteriorating effects of the environment than are the materials employed in prior art vibration isolating mounts.

SUMMARY OF THE INVENTION

The vibration isolating mount of the present invention is generally comprised of a pair of spaced, parallel plates and a center member extending between and connecting the plates. In the preferred embodiment of the invention, a pair of metal plates is employed and the plates are interconnected by a center member constructed entirely of a polyether-based urethane.

Each plate of the pair of metal plates is flat and rectangular. Four attachment holes extending through the plates are spacially arranged along opposite lateral side edges of each plate. Four lug holes are also provided through the centers of the plates intermediate to the attachment holes.

The lug holes through the centers of the plates are divided into separate first and second sections The first sections of the lug holes extend into the plates from the proximal surfaces of the plates. The proximal surfaces of the plates are connected to the center member. The first sections of the lug holes are smaller than the second sections, have a general elongated shape, and extend approximately half-way through the thickness of the plates. The second sections of the holes are larger but have the same general elongated shape. The second sections extend from the ends of the first sections of the holes, at the middle thickness of the plates, to the outer or distal surfaces of the plates. All edges of both holes have a radius. The second sections of the lug holes have a greater cross sectional area than the first sections of the lug holes and also have a greater volume that the first sections.

The center member connecting the proximal surfaces of the opposed plates are constructed of a polyether-based urethane. The polyether elastomeric material is uniform throughout the center member. The center member includes an elongated middle section that extends between the opposed proximal surfaces of the pair of plates. The opposite ends of the center member flare outward from the middle section and form fillets that connect the opposite ends of the center member to the proximal surfaces of the opposed plates.

Portions of the opposite ends of the center member also extend into and fill the first and second sections of the lug holes provided through the centers of the opposed plates. Because the cross sectional area of the second sections of the lug holes is larger than the cross sectional areas of the first sections of the lug holes, the portions of the center member filling the lug holes act as lugs with enlarged heads.

A chemical bonding agent is applied to the plate proximal surfaces between the fillets formed at the opposite ends of the center member, including the first and second sections of the lug holes. This chemical bond adheres the pair of plates to the opposite ends of the center member. The elastomeric material of the center member that fills the lug holes at the centers of the opposed plates forms lugs that provide a mechanical connection, with a chemical bond, between the opposite ends of the center member and the opposed plates. The combination of the mechanical connection and the chemical bonding between the center member and the opposed plates provides a connection between the center member and plates that is capable of resisting a greater shear stress than prior art vibration mounts employing plates adhered to elastomeric members by chemical bonding alone.

By constructing the center member of a polyether-based urethane, the vibration mount is capable of resisting a pulling force that is four times larger than the pulling force that some prior art vibration mounts are capable of withstanding without succumbing to shear stress failure.

Moreover, by constructing the center member of the polyether-based urethane, the center member is better suited to resist high tension and compression forces, abrasion, tearing, and repeated flexing, and is better suited to resist the affects of hydrolysis caused by exposure to the environment than are prior art vibration mounts employing rubber as the elastomeric material.

BRIEF DESCRIPTION OF THE DRAWINGS

Further objects and features of the present invention are revealed in the following detailed description of the preferred embodiment of the invention and in the drawing figures wherein:

FIG. 1 is a perspective view of the vibration isolating mount of the present invention;

FIG. 2 is an elevation view of four of the vibration isolating mounts of the invention in their operative environment connecting an exciter case of a vibratory pile driver and extractor to a suspension housing;

FIG. 3 is an elevation view of the operative environment of invention showing four of the vibration isolating mounts stressed in shear between the exciter case of a vibratory pile driver and extractor and a suspension housing;

FIG. 4 is a segmented elevation view in section of a portion center member engaged in a lug hole of one of the plates of the invention taken along the line 4—4 of FIG. 1;

FIG. 5 is a segmented elevation view in section of the connection between the center member and a plate of the invention taken along the line 5—5 of FIG. 4; and FIG. 6 is a perspective view of the fixture assembly employed in constructing the vibration isolating mount of the invention.

DESCRIPTION OF THE PREFERRED EMBODIMENT

The vibration isolating mount 10 of the present invention is shown in FIG. 1. The mount is generally comprised of a pair of spaced, parallel plates 12, 14 that are substantially identical to each other. A center member 16 extends between the pair of plates and connects the plates to each other. In the preferred embodiment of the invention, the plates 12, 14 are constructed from metal plate and the center member is constructed entirely of a polyether-based urethane, preferably ADIPRENE L-83 with 4, 4'-methylenebis (2-chloroaniline), known as MBCA or MOCA.

As can be seen in FIG. 1, each of the metal plates 12, 14 is flat and has a rectangular configuration including pairs of lateral side edges 18, 22, 24, 26 and pairs of longitudinal side edges 28, 32, 34, 36, respectively. Eight attachment holes 38, 42 are bored through each of the respective plates. The attachment holes are provided to attach the vibration isolating mount between an exciter and a suspension housing of a vibratory pile driver and extractor. The eight attachment holes through each plate are arranged in groups of four holes that are spacially arranged along the opposite lateral side edges of each plate. Four lug holes 44 are also provided through the centers of each plate. As is best seen in FIG. 1, the four lug holes 44 are positioned at the centers of the plates intermediate the attachment holes.

The construction of the lug holes extending through the centers of the plates is best seen in FIGS. 4 and 5 which show a cross section of one of the lug holes. As seen in FIGS. 4 and 5, the lug holes 44 are divided into separate first 46 and second 48 sections. The first sections of the lug holes 46 extend into the thickness of the plates 12, 14 from proximal surfaces 52, 54 of the plates. The proximal surfaces 52, 54 of the plates 12, 14 are those surfaces that face each other and are connected to the center member 16. The first sections 46 of the lug holes 44 are elongated and have radiused edges. The first sections 46 extend approximately half-way through the thickness of the plates. The second sections 48 of the lug holes 44 have the same general elongated shape, except larger, as is best seen in FIG. 1. The second sections 48 of the lug holes have a greater cross sectional area and internal volume than the first sections 46 of the holes. The second sections 48 extend from the ends of the first sections 46 of the holes, at the middle thickness of the plates, to outer or distal surfaces 56, 58 of the plates 12, 14.

The center member 16 of the vibration mount in the preferred embodiment of the invention is constructed uniformly of a polyether-based urethane. The center member includes an elongated middle section 62 that extends between the opposed proximal surfaces 52, 54 of the pair of plates 12, 14. The opposite ends 64, 66 of the center member 16 flare outward from the middle section 62 and form flared-out portions 68, 72 that connect the opposite ends of the center member to the proximal surfaces 52, 54 of the opposed plates 12, 14.

Portions of the opposite ends 64, 66 of the center member 16 also extend into and fill the first and second sections 46, 48 of the lug holes provided through the centers of the opposed plates. FIGS. 4 and 5 show a portion 74 of the center member extending into and filling one of the lug holes 44. As can be seen in FIGS. 4 and 5, because the cross sectional areas of the second sections 48 of the lug holes are larger than the cross sectional areas of the first sections 46 of the lug holes, the portions 74 of the center member 16 that fill the lug holes 44 are formed as lugs with enlarged heads 76. The enlarged heads 76 of the center member lugs serve to connect mechanically the opposed plates 12, 14 to the opposite ends 64, 66, respectively, of the center member.

The vibration isolating mount 10 is constructed by molding the center member 16 directly to the proximal surfaces 52, 54 of the pair of plates 12, 14. In constructing the vibration mounts, a large fixture 78 such as that shown in FIG. 6 of the drawing figures is used. The fixture 78 is comprised of a base plate 82 having a pair of angle iron pieces 84 secured in a perpendicular orientation to the top surface of the plate 82. Two pairs of aligned screw threaded holes (not shown) extend into the base plate 82 from the top surface. Each pair of holes is positioned on an opposite side of the base plate top surface from one of the pair of angle iron pieces 84. Four adjustment screws 86 are screw threaded into the two pairs of holes. The fixture 78 also includes a second pair of angle iron pieces 88 that are each welded to a metal plate 92 having a pair of slots 94 provided therein. The four screws 86 engage through the pairs of slots 94 of the plates 92 and adjustably secure the second pair of angle iron pieces 88 to the top surface of the base plate 82. By loosening the four screws 86, the second pair of angle iron pieces 88 may be adjustably positioned toward and away from the first pair of angle iron pieces 84. A sheet metal plate 98 having opposite in-turned edges is slipped down over the outturned edges of the first pair of angle iron pieces 84. A second sheet metal plate 96 having opposite in-turned edges is slip fit over the out-turned edges of the second pair of angle iron pieces 88.

The fixture assembly 78 also includes a pair of curved frame members 102. The frame members are substantially identical to each other, and each is provided with opposite concave 104 and convex 106 surfaces and flat vertical margins 108 at opposite ends of the curved members. Pairs of reinforcing rods 112 extend between the vertical margins 108 of each of the curved frame members.

In constructing a vibration mount of the present invention, the mount plates 12, 14 first have their proximal surfaces 52, 54 coated with a bonding agent in the areas of the surfaces to be covered by urethane, and have the complete surfaces of their lug holes 46, 48 covered with the same bonding agent. The mount plates 12, 14 are then set on the fixture with the distal surfaces 56, 58 of the plates positioned against the sheet metal plates 96, 98 of the fixture 78. Next, the pair of curved frame members 102 have their convex surfaces 106 coated with a releasing agent in the areas of the surfaces that will be covered by urethane, and are then inserted between the proximal surfaces 52, 54 of the pair of vibration mount plates. The curved frame members are inserted between the mount plates 12, 14 with the convex surfaces 106 of the frame members being spaced from and mutually opposing each other. Scribe lines (not shown) are provided on the top surface of the base plate 82 to properly position the pair of curved frame members 102 by placing them on the scribe lines. A spacer member 114 is also provided to properly space the top ends of the curved frame members 102 from each other. The top surface of the base plate 82 is also coated with the releasing agent in the areas to be covered by urethane.

With the curved frame members 102 properly positioned between the vibration mount plates 12, 14, the second pair of angle iron pieces 88 are adjusted toward the first pair of angle iron pieces 84 by sliding the slotted plates 92 over the top surface of the base plate 82. As the second pair of angle iron pieces 88 are adjusted toward the first pair of pieces 84, the distal surfaces of the vibration mount plates 12, 14 are pressed flat against the sheet metal plates 96, 98 of the fixture, and the proximal surfaces of the vibration mount plates 12, 14 are pressed flat against the vertical margins 108 of the curved frame members 102. With the pair of curved frame members 102 held tight between the vibration mount plates 12, 14, and the pair of vibration mount plates held tight between the sheet metal plates 96, 98 of the fixture, the adjustment screws 86 are tightened down into the base plate 82 to hold the component parts of the fixture 78 and the vibration mount plates 12, 14 in their relative positions. Additional clamping assemblies 116 may be secured between the upper ends of the first and second pairs of angle iron pieces 84, 88 to securely hold the component parts of the fixture assembly 78 and the vibration mount plates 12, 14 in their relative positions.

With the pair of plates 12, 14 and the pair of curved frame members 102 positioned in the fixture 78 as shown in FIG. 6, the elastomeric material in a liquid state is poured into the cavity formed between the opposed pair of curved frame members 102 and the opposed pair of vibration mount plates 12, 14. The elastomeric material is poured between the opposed proximal surfaces 52, 54 of the vibration mount plates and the opposed convex surfaces 106 of the curved frame members. The liquid material completely fills the volume between the plates and frame members, and also fills the internal volumes of the lug holes 44 provided through the centers of the plates.

After the elastomeric material is poured, it is permitted to cure. After curing, the clamping assemblies 116 are removed and the sliding metal plates 92 are released by loosening the four screws 86. The second pair of angle iron pieces 88 and the sheet metal plate 96 mounted on the angle iron pieces are then moved back away from the opposed pair of curved frame members 102. The opposed pair of frame members 102 are then disassembled from the fixture 78, and the vibration isolating mount comprising the opposed pair of plates 12, 14 interconnected by the elastomeric center member 16 is then removed from the fixture assembly 78.

Constructing the vibration isolating mount 10 by molding the center member 16 directly to the proximal surfaces of the opposed plates 12, 14 provides a chemical bond between the flared-out portions 68, 72 formed at the opposite ends of the center member and the proximal surfaces of the plates. The chemical bond adheres the plates to the opposite ends 64, 66 of the center member 16. The liquid elastomeric material that passes through and fills the lug holes 44 in the plates forms the lugs 74 with enlarged heads 76 when the elastomeric material is cured. The enlarged heads 76 of the lugs 74 provide a mechanical and chemical connection between the opposite ends 64, 66 of the center member and the opposed plates 12, 14. As can be seen in FIG. 1, the lugs formed from the elastomeric material are positioned opposite the fillets 68, 72 and enhance the ability of the fillets to adhere to the proximal surfaces of the plates. The combination of the mechanical connection provided by the lugs and the chemical bonding between the center member and the opposed plates provides a connection between the center member and the plates that is capable of resisting a greater sheer stress than prior art vibration mounts employing plates adhered to elastomeric materials by chemical bonding alone. The lugs provide a mechanical bond not found in prior art vibration mounts, thus the vibration mount of the invention is inherently safer than prior art mounts.

FIGS. 2 and 3 show one operative environment of the vibration isolating mounts 10. FIGS. 2 and 3 show four of the mounts 10 connected between an exciter 118 and a suspension housing 122 of a vibratory pile driver and extractor 124. As shown in FIGS. 2 and 3, the suspension housing 122 is suspended by cables 126 from a crane (not shown). The exciter 118 is connected to the suspension housing 122 by four vibration isolating mounts 10. The clamp housing 128 of the exciter 118 is shown connected to the top end of a pile 132. FIG. 2 shows the relative positions of the suspension housing 122, the vibration isolating mounts 10, and the exciter 118 when being used to drive the pile 132 downward into the ground. FIG. 3 shows the relative positions of the suspension housing 122, the vibration isolating mounts 10, and the exciter 118 when pulling a pile 132 from the ground.

By constructing the vibration isolating mounts 10 from a polyether-based urethane, in particular ADIPRENE L-83 with MOCA, the mounts provide certain benefits over prior art vibration mounts employed in the same operative environment shown in FIGS. 2 and 3. By constructing the center member of a polyether-based urethane, the vibration mount 10 is capable of resisting a pulling force that is four times larger than the pulling force that some prior art vibration mounts are capable of withstanding without succumbing to shear stress failure. As shown in FIG. 3, when the vibration mounts 10 are employed to pull piles or sheeting from the ground, the mounts are stressed in shear and are stretched to a certain extent to exert a pulling force on the exciter 118. Even when stretched as shown in FIG. 3 the mounts still substantially isolate the vibrations of the exciter 118 from reaching the suspension housing 122.

Prior art vibration mounts employing rubber elastomeric members have been found to fail at about seven inches of stretch. The vibration mount of the invention 10 is capable of stretching to about twenty-three inches without failure.

The vibration mount of the invention is also lighter than prior art mounts constructed of rubber, having about one-quarter the weight of prior art mounts. The reduction in weight reduces the cost of shipping the mounts and also makes them much easier to handle when connecting the mounts between a suspension housing and exciter.

The polyether-based urethane of the mount has been found to isolate vibrations better than vibration mounts employing rubber elastomeric members and also has been found to be stronger when stressed in shear than vibration mounts employing rubber elastomeric members. The polyether-based urethane is more chemically resistant to oils and greases than is rubber and is more resistant to the effects of hydrolysis caused by prolonged exposure to the outside environment. Polyether-based urethanes have also been found to be more resistant to the effects of hydrolysis than are polyester-based urethanes. Moreover, by constructing the center member 16 of the polyetherbased urethane, the center member is better suited to resist high tension and compression forces, abrasion, tearing, and repeated flexing than are prior art vibration mounts employing rubber as the elastomeric member.

While the present invention has been described by reference to a specific embodiment, it should be understood that modifications and variations of the invention may be constructed without departing from the scope of the invention defined in the following claims.

What is claimed is:

1. A vibration isolating mount for use with a vibratory pile driver and extractor, the mount comprising:
   a pair of plates, each plate of the pair including a plurality of lug holes bored through the plate;
   each lug hole of the plurality of lug holes being divided into separate first and second sections, the first section of each lug hole having cross sectional area than the second section of each lug hole;
   a resilient center member extending between the pair of plates and connection the pair of plates for relative translatory movement in spaced and substantially parallel relative positions, portions of the center member filling the first and second sections of the pluralities of lug holes of the pair of plates;
   the center member has an elongated middle section and opposite ends that are connected to the pair of plates, the opposite ends of the center member flare outward from the middle section and are connected to mutually opposed surfaces of the pair of plates for fixed movement therewith when the pair of plates are moved in translation away from each other, and the middle section is resiliently stretchable in tension when the pair of plates are moved in translation away from each other.

2. The mount of claim 1, wherein:
   the first section of each lug hole has a lesser internal volume than the second section of each lug hole.

3. The mount of claim 1, wherein:
   the center member is constructed entirely and uniformly of an elastomeric material.

4. The mount of claim 3, wherein:

the elastomeric material is a polyether-based urethane.

5. The mount of claim 1, wherein:

the first section of each lug hole of the pluralities of lug holes has a slotted elongated configuration and the second section of each lug hole of the pluralities of lug holes has a slotted elongated configuration, the elongation of the second section being greater than the elongation of the first section.

6. The mount of claim 1, wherein:

each plate of the pair of plates has a distal surface and a proximal surface on opposite sides of the plate, the proximal surfaces of the pair of plates being connected by the center member, and the first sections of the lug holes being adjacent the proximal surfaces of the plates and the second sections of the lug holes being adjacent the distal surfaces of the plates.

7. The mount of claim 1, wherein:

each plate of the pair of plates is flat.

8. The mount of claim 1, wherein:

the center member is connected to the pair of plates by chemical bonding between the center member and the pair of plates, and the center member is connected to the pair of plates by the portions of the center member that fill the first and second sections of the pluralities of lug holes in the pair of plates.

9. A method of making a vibration isolating mount for use with a vibratory pile driver and extractor, the method comprising the steps of:

providing a pair of plates each having opposite first and second surfaces;

boring pluralities of holes through the centers of the pair of plates;

shaping each of the holes with first and second separate sections of different internal volumes, with the first sections of the holes being adjacent the first surfaces of the plates and the second sections of the holes being adjacent the second surfaces of the plates;

providing a fixture for supporting the plates in spaced, mutually opposed positions;

inserting each plate of the pair of plates into the fixture with the first surfaces of the plates mutually opposing each other;

providing a pair of curved frame members, each frame member having opposite ends and opposite concave and convex surfaces;

inserting the pair of frame members into the fixture with the convex surfaces of the frame members being spaced from and mutually opposing each other;

pouring an elastomeric material in a liquid state into an area between the pair of plates and between the pair of frame members;

filling the pluralities of holes in the pairs of plates and filling a volume defined by the pair of plates and the pair of frame members with the elastomeric material;

curing the elastomeric material filling the volume, thereby forming an elastomeric center member extending between the pair of plates and connecting the pair of plates in spaced and parallel relative positions to each other;

removing the pair of plates, the pair of frame members, and the center member connecting the pair of plates from the fixture and separating the pair of frame members from the pair of plates and the center member.

10. The method of claim 9, wherein:

the pluralities of holes bored through the pair of plates are shaped with the first sections of the holes having a smaller internal volume than the second sections of the holes.

11. The method of claim 9, wherein:

the opposite ends of each frame member of the pair of frame members contact the first surfaces of the pair of plates when the pair of frame members are inserted into the fixture between the pair of plates.

12. The method of claim 9, wherein:

curing the elastomeric material forms a chemical bond between the center member and the first surfaces of the pair of plates and a mechanical connection between the center member and the pluralities of holes through the pair of plates.

13. The method of claim 9, wherein:

the pluralities of holes bored through the pair of plates are shaped with the first sections of the holes having a smaller cross sectional area than the second sections of the holes.

* * * * *